No. 642,844. Patented Feb. 6, 1900.
G. HEIDEL.
PUSH BUTTON FOR BATTERY INDICATORS.
(Application filed Jan. 28, 1899.)
(No Model.)
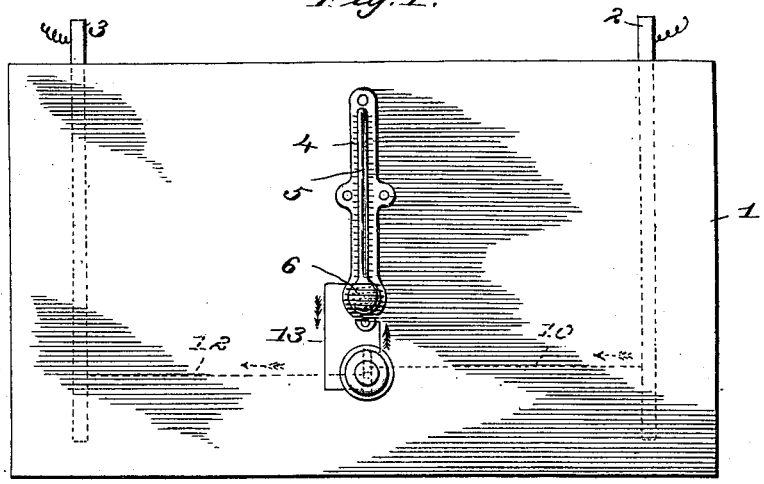
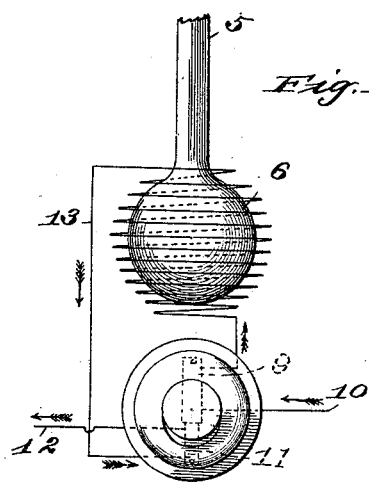
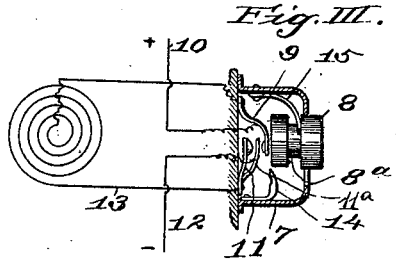
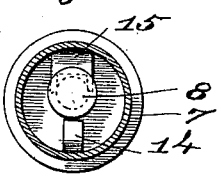
Witnesses
Inventor
Gustavus Heidel
By Knight Bros
Attorneys

UNITED STATES PATENT OFFICE.

GUSTAVOS HEIDEL, OF ST. LOUIS, MISSOURI, ASSIGNOR TO THE GLOBE ELECTRIC COMPANY, OF SAME PLACE.

PUSH-BUTTON FOR BATTERY-INDICATORS.

SPECIFICATION forming part of Letters Patent No. 642,844, dated February 6, 1900.

Application filed January 28, 1899. Serial No. 703,688. (No model.)

*To all whom it may concern:*

Be it known that I, GUSTAVOS HEIDEL, a citizen of the United States, residing at the city of St. Louis, in the State of Missouri, have invented certain new and useful Improvements in Push-Buttons for Battery-Indicators, of which the following is a full, clear, and exact description, reference being had to the accompanying drawings, forming part of this specification.

My invention relates to a push-button for controlling the circuit of an indicator applied to storage or other batteries, through means of which the strength of the energy contained by the battery may be known.

It is the object of my invention to provide in connection with suitable wiring and an indicator a convenient form of push-button, whereby at any time the voltage or amperage may be determined by throwing the indicator into circuit connection with the electrodes of the battery.

My invention consists in features of novelty hereinafter fully described, and pointed out in the claim.

Figure I is a view in elevation of a battery with an indicator constructed in accordance with my invention applied thereto. Fig. II is an enlarged detail elevation of the lower end of the indicator-tube and circuit-connecting button with the wiring shown diagrammatically. Fig. III is a sectional view of the circuit-connecting button with the indicator-wiring shown diagrammatically. Fig. IV is a cross-sectional view of the circuit-connecting button.

1 designates a battery-cell, which may be of a storage, primary, or other battery, and which contains positive and negative electrodes 2 and 3.

4 designates a gage-plate mounted on the cell 1, which is applied with scales for indicating the voltage or amperage of the current contained by the cell 1. The scales on the gage-plate are preferably so arranged that one column will designate the amperage, while the opposite column will designate voltage.

Where the device is used to indicate voltage, a resistance-coil may be included in the circuit.

5 designates a mercury-tube mounted on the gage-plate 4 and provided with a bulb 6.

7 designates the housing of a push-button, which contains a push-button 8.

9 is a spring-contact located within the button-housing 7, to which a positive wire 10 leads from the positive electrode 2 of the battery.

11 is a spring-contact also located within the button-housing, toward which the contact-spring 9 is adapted to be thrown in forming a circuit from said positive wire 10 to a negative wire 12, leading to the negative electrode 3. The negative wire 12 is connected to a contact-arm 11$^a$, that is interposed between the contacts 9 and 11. (See Fig. III.)

13 designates a conducting-wire, the ends of which are connected to the contact-springs 9 and 11, the said wire 13 being carried to the bulb of the mercury-tube 5 and coiled therearound, so that heat created by the electrical current of the battery may be produced in said wire 13 for the purpose of heating the bulb of the mercury-tube 5 and cause the mercury therein to expand in said tube, whereby the strength of electrical current contained by the battery will be designated according to the height to which the mercury rises within said tube relative to the scales on the gage-plate 4.

Fig. III suggests one arrangement of contacts for utilizing the indicator for batteries. Current passes over the wire 10 to the contact-arm 9, thence to the heating-coil of the indicator, thence over the wire 13 to the contact 11, thence to contact 11$^a$, which is in constant connection with the contact 11, to wire 12, and back to the battery. The indicator is therefore normally in operation. If, however, the button 8 be pushed in and then slid to bring the projection 14 into the groove 8$^a$, the indicator will then be cut out and the current will then pass directly through wire 10, contact 9, contact 11$^a$, and wire 12.

For the purpose of maintaining the contact-springs 9, 11, and 11$^a$ in contact, so that the changing condition of the strength of the electrical current may be continually observed—as, for instance, during a period that the battery is being charged—I provide a catch arrangement whereby the circuit-connecting button may be held inwardly until it is desired to cut the indicator out of circuit. This arrangement comprises a catch 14 within the push-button housing, with which the button 8 may be engaged by pressing the said button to one side when it is pushed inwardly to throw the contacts 9, 11, and 11$^a$ together. The said catch 14 engages in a groove 8$^a$ in the push-button and is held against the catch by a spring 15, which also serves to retract the push-button when it is moved away from the catch.

I claim as my invention—

In combination with an electric cell, and a current-measuring instrument, the hereindescribed push-button having connections for controlling the working circuit from said cell and connections whereby the measuring instrument is introduced by the push-button into said working circuit, said push-button being axially movable for making electric connections and laterally movable, and having a locking projection with which it moves into engagement by its lateral movement for locking it against axial movement; substantially as herein explained.

GUSTAVOS HEIDEL.

In presence of—
E. S. KNIGHT,
STANLEY STONER.